April 7, 1942.  A. L. PARKER  2,278,479
TUBE COUPLING
Filed Dec. 9, 1939
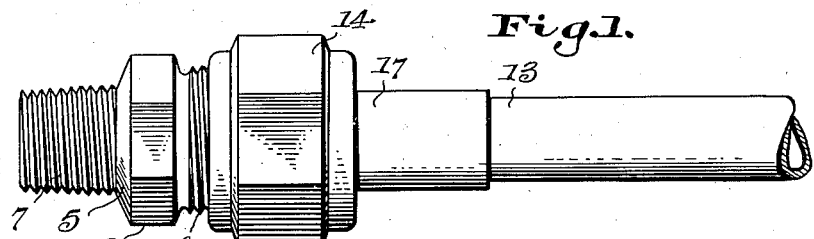
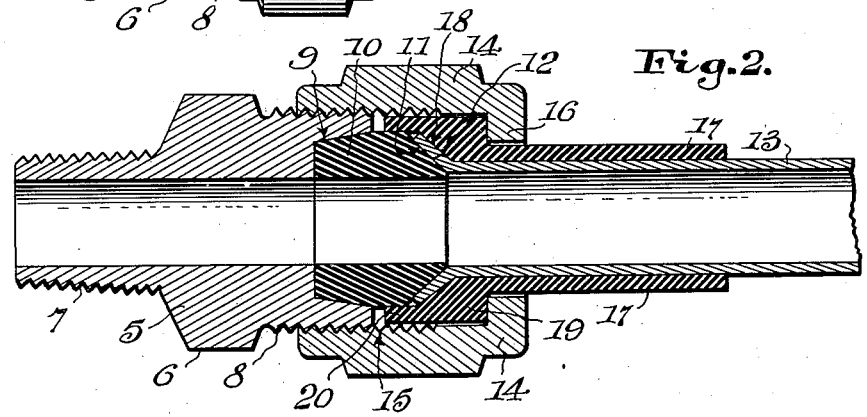
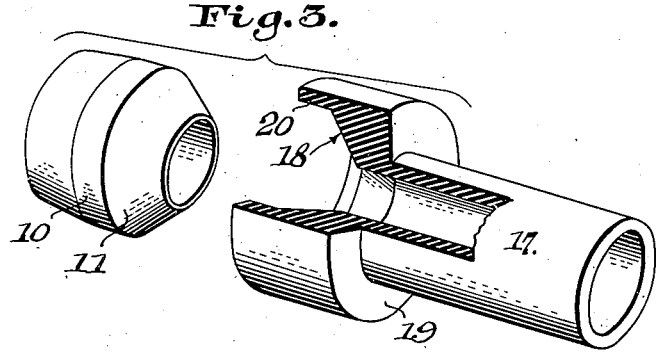
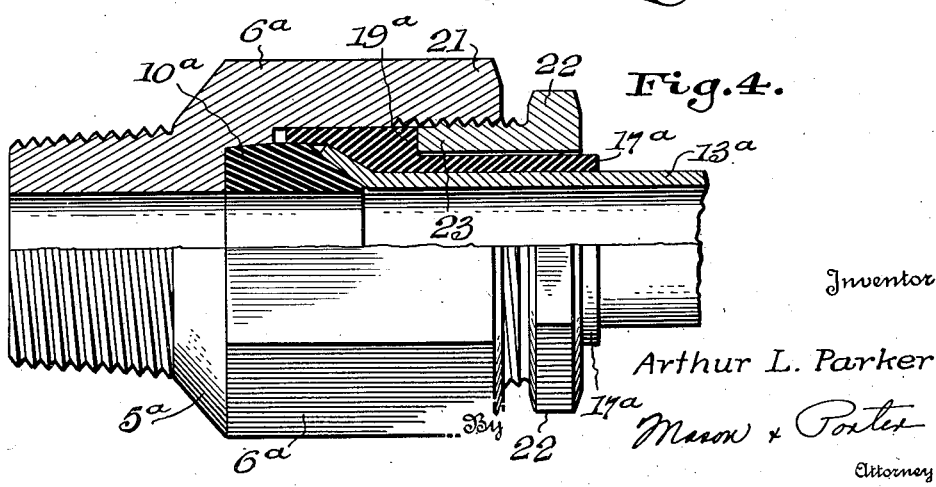
Inventor
Arthur L. Parker
By Mason & Porter
Attorneys Patented Apr. 7, 1942

2,278,479

UNITED STATES PATENT OFFICE 2,278,479

TUBE COUPLING

Arthur L. Parker, Cleveland, Ohio

Application December 9, 1939, Serial No. 308,467

1 Claim. (Cl. 285—16)

The present invention relates to new and useful improvements in tube couplings, and more particularly to improvements in couplings for clamping the flared ends of metal tubes such as are typified in U. S. Letters Patent to Arthur L. Parker, 1,893,442 of January 3, 1933, and it primarily seeks to provide a novel coupling structure in which the tube is firmly clamped between clamping surfaces of insulating material effective to prevent the conducting of electrical charges through the coupling.

In tube couplings of the type referred to, the flared ends of the tubes are clamped between coniform surfaces formed on threadably connected male and female coupling members. The female member usually is formed in two parts, one a threaded and shouldered nut, and the other a protective sleeve which surrounds the tube and includes one of the coniform clamping surfaces and a shoulder which is engaged by the nut shoulder to be moved thereby during the tube clamping operation. The interengaging tube and coupling member parts usually are formed of metal, and when attempts are made to use these couplings in conjunction with electrical apparatus, say for example in conjunction with arc welding machines having hydraulically operated chucks, electrical charges may at times be conducted through the coupling members to the tubing or vice versa. Obviously such conducting of electrical charges is objectionable, and it is the purpose of the present invention to provide a novel form of tube coupling in which this objectionable conducting of electrical charges is impossible.

In its more detailed nature the invention seeks to provide a tube coupling of the nature stated in which the coupling male member includes an insert of insulating material on which the male coniform clamping seat is formed, and in which the tube protecting and clamping sleeve is formed of insulating material and includes the female coniform clamping seat.

Another object of the invention is to provide a tube coupling of the character stated in which the sleeve includes a skirt portion which extends beyond the flared seat and which is effective to prevent spreading of the flared end of the clamped tube into contact with metallic coupling parts.

With the above and other objects in view that will hereinafter appear, the nature of the invention will be more fully understood by following the detailed description, the appended claim, and the several views illustrated in the accompanying drawing.

In the drawing:

Figure 1 is a side elevation illustrating the improved coupling.

Figure 2 is a central longitudinal section through the coupling illustrated in Figure 1.

Figure 3 is a detail perspective view illustrating the seat piece and the tube protecting and clamping sleeve in separated relation, parts being broken away and in section.

Figure 4 is a view similar to Figure 2 illustrating a slightly modified form of the invention, parts being shown in elevation.

The improved coupling consists of a male member or body piece 5 including a non-circular portion 6, an externally threaded mounting portion 7, and an externally threaded nut-receiving portion 8. The member 5 is centrally bored in the usual manner and is equipped at its upper end with a counterbore 9 which is preferably slightly flared.

A clamping seat piece 10 is force-fitted or otherwise secured in the counterbore 9 and extends a distance from the upper end of the male member 5. The seat piece 10 includes a center bore axially aligned with the bore of the member 5 and has its upper external surface shaped to form a coniform seat 11. This seating piece is formed of insulating material, preferably hard fiber capable of providing a smooth hard coniform male coupling seat 11.

The flared end 12 of the tube 13 which is to be coupled is adapted to be securely clamped against the seat 11 in the manner well known in the art.

The female coupling member is formed of two elements in the usual manner, and includes a coupling nut sleeve and a tube protecting and clamping sleeve. The nut sleeve 14 is internally threaded as at 15 to threadably engage the portion 8 of the male member 5 and includes an inwardly directed clamping shoulder 16. The protective sleeve 17 is formed of insulating material, preferably the same hard fiber material of which the seating piece 10 is formed, and includes a flared clamping surface 18 for opposing the flared end 12 of the tube 13, and a shoulder portion 19 which is engaged by the sleeve nut shoulder 16.

It will be noted also that the sleeve 17 includes a cylindrical skirt extension 20 which extends beyond the flared clamping surface 18.

When the coupling parts are assembled in the manner illustrated in Figures 1 and 2, the nut sleeve 14 forces the sleeve 17 longitudinally toward the seating piece 10, and the flared end 12 of the tube 13 is securely clamped between the flared surface 18 of the sleeve 17 and the tapered surface 11 of the seating piece 10. By forming the tube 17 and the seating piece 10 of hard fiber, the tube 13 is insulated from the metallic coupling elements 5 and 14 and yet nothing in the way of firmness of coupling is sacrificed in thus forming the electricity non-conducting coupling.

In order to definitely assure against spreading of the flared end of the tube 12 into metal to metal contact with coupling parts, the sleeve skirt 20 surrounds and depends below the flared end of the tube and telescopes a portion of the seating piece 10 so that it is impossible to force the tube end into metal to metal contact with either of the coupling elements 14 and 5. See Figures 2 and 3.

In Figure 4 of the drawing, there is illustrated a slightly modified form of the invention in which the tube 13a, the sleeve 17a, and the seating piece 10a are formed in the same manner as illustrated in Figures 2 and 3, but the male member 5a has the non-circular body portion 6a extended as at 21 and internally threaded to receive the externally threaded nut sleeve 22 which includes an inwardly extended shoulder 23 for engaging the shoulder 19a of the tube protecting and clamping sleeve 17a.

It is of course to be understood that the details of structure and arrangement of parts may be variously changed and modified without departing from the spirit and scope of my invention.

I claim:

In a coupling for tubes having the ends thereof flared, metallic coupling members having threaded engagement with each other, one of said coupling members having a coniform male seat associated therewith formed of a hard electricity non-conducting material and adapted to engage the inner face of the flared end of a tube, the other of said coupling members having a clamping shoulder, a sleeve formed of a hard electricity non-conducting material surrounding said tube within and extending endwise beyond the clamping shoulder provided coupling member and having a solid head provided with a shoulder against which said clamping shoulder engages and a coniform flare adapted to engage the outer face of the flared end of said tube and a cylindriform skirt surrounding and extending beyond the flared end of said tube, whereby when the coupling members are threaded together with the tube and sleeve between them the tube will be firmly and rigidly clamped and insulated from electricity conducting contact relation with any metallic part of the coupling and said skirt will prevent spreading of the flared tube end into contact with any metallic part of the coupling.

ARTHUR L. PARKER.